United States Patent [19]

Troccoli

[11] 4,079,189

[45] Mar. 14, 1978

[54] HIGH VOLTAGE CABLE SPLICE

[75] Inventor: Arthur M. Troccoli, Old Bridge, N.J.

[73] Assignee: Mac Products, Inc., Kearny, N.J.

[21] Appl. No.: 661,420

[22] Filed: Feb. 26, 1976

[51] Int. Cl.² .......................................... H02G 15/08
[52] U.S. Cl. ............................... 174/73 R; 174/88 C; 174/93
[58] Field of Search ............... 174/73 R, 73 SC, 88 R, 174/88 C, 91, 93, 138 F

[56] References Cited

U.S. PATENT DOCUMENTS

| 3,612,746 | 10/1971 | Sankey | 174/73 R |
| 3,673,311 | 6/1972 | Misare | 174/73 R |
| 3,725,846 | 4/1973 | Strain | 174/73 R UX |
| 3,761,602 | 9/1973 | DeSio et al. | 174/73 SC |
| 3,816,642 | 6/1974 | Toedtman et al. | 174/138 F |

FOREIGN PATENT DOCUMENTS 1,448,679  6/1966  France ............................... 174/138 F Primary Examiner—Laramie E. Askin Attorney, Agent, or Firm—Sheldon H. Parker

[57] ABSTRACT

The invention relates to a device for use in splicing high voltage cables. The device includes an elongated outer semi-conductive section, an elongated inner insulative section and an inner annular semi-conductive section which serves as a corona shield. The inner semi-conductive section has a plurality of circumferentially spaced ribs extending radially inward and having a longitudinal extent which is equal to a major portion of the length of the inner annular semi-conductive member. In use, the bare wire ends of a pair of high voltage cables to be spiced are electrically connected by means of a tubular metal connector. The circumferentially spaced ribs are in electrical and thermal contact with the metal connector. The ends of the outer semi-conductive section are electrically connected to the outer covering of the high voltage cables by means of semi-conductive end caps which have a radial dimension approximately equal to that of end portions of the outer semi-conductive section and overlap the ends such that their position can be longitudinally adjusted.

5 Claims, 6 Drawing Figures

HIGH VOLTAGE CABLE SPLICE

BACKGROUND OF THE INVENTION

1. Field of the Invention

The present invention relates to an improvement in joints intended in particular for the connection of conductors of corresponding ends in single or multi-core electric cables for medium and high voltages, insulated with an extruded dielectric material, for example, saturated chain ethylene-propylene copolymer or ethylene-propylene-diene terpolymer, polyethylene, crosslinked polyethylene, etc.

2. Brief Description of the Prior Art

In the field of conductors for the transmission of high-currents for power distribution purposes, it is often necessary to provide suitable electrical and mechanical connection between two or more high-current conductors, for example between such conductors of the same or different sizes or between such a conductor and a terminal. Furthermore, particularly in field operations such as the outdoor laying or repairing of underground cables, it becomes important to be able to provide such junctions quickly, without elaborate equipment and without the use of equipment which requires specialized skills or critical or dangerous operations, or which is unsuited to outdoor use. In addition, it is generally desirable that such junctions be as short as possible, not only from considerations of expense of material and space required, but also because the conductor normally must be electrically insulated and the junction must therefore be thoroughly covered with insulating material such as electrical tape or other suitable insulating material. The time and materials required for the necessary thorough taping or other insulating procedure becomes greater the greater the length of the junction region.

Corona problems develop whenever sufficient electrical voltage difference is present between spaced conductors, separated by air spacing or air pockets. Corona, in addition to wasting power, is deleterious to many insulating materials and often causes physical deterioration and rapid chemical decomposition thereof. In addition, corona envelopes cause a radio interference and noise which is objectionable.

It is also known to join high-current conductors by butt-welding of their adjacent ends. While such welding tends to permit use of shorter junctions for the same maximum current, welding often involves so many problems and safety hazards that such procedures are usually considered very undesirable, particularly in field service or installation applications. For example, in a typical power-distribution system so many primary and secondary splices of large-diameter conductors need to be made that the wide-spread use of welding equipment entails not only costly investment in the equipment, but also troublesome problems with scheduling the use of the equipment; additionally, skilled welders are generally in short supply. Importantly also, the use of welding equipment creates substantial problems of fire and explosion hazard.

One of the methods at present in use for constructing joints between conductors with extruded insulation consists in shaping the end of the insulation similar to a pencil point, and in rebuilding it, after the connection of the conductors, by means of a winding of plastic or rubber tape of dielectric material appropriately wound up in a cigar-wrapper-like fashion. As is known, said process is slow and requires highly specialized personnel and is, therefore, expensive.

Further, despite the skill of the operators, there is always the possibility of formation of wrinkles in the wrapping, in which air can be trapped, with the consequent effect of disruptive discharges when the cable is in use.

Another conventional method is that known in this field by the name "pennant" type lapping. In this case, the insulation in the jointing zone is restored with the aid of a previously shaped foil of rubber or plastic material. However, in this case, also, there is the risk of stretching the foil too much or too little, during its application, with the possible formation of wrinkles or pockets in which air might be retained.

Another method provides the rebuilding of the joints by means of special tapes between which is subsequently injected a resin capable of solidifying by polymerization. In this cases as well, the method is slow, specialized labor is necessary, and there is still the risk the air bubbles may be trapped in the wrinkles of the winding and may not be reached by the resin. Also, there is the danger that air bubbles will be entrapped in the resin.

Another method consists in applying half-shells made of polyethylene around the joining zone. Said half-shells have the object of forming means for receiving a resin which solidifies by polymerization. The variations in the diameter of the cable insulation during the cable use, due, for example, to the thermal cycles, can easily cause the detachment of the insulation from the resin, with the consequent formation of zones in which air is present.

According to another method, the insulation is rebuilt by applying a pre-shaped sleeve of vulcanized rubber, having an inner diameter smaller than the diameter of the cable core. The sleeve is forced on the core, and it is, therefore, necessary, for each core having a certain nominal diameter, to have available a plurality of sleeves having a different diameter in order to take into accounts the processing tolerances.

According to another method, the joint is carried out by means of sleeves provided with a longitudinal cavity or bore of such a diameter as to be able to slide on the cable core, and the space between the inner surface of said longitudinal cavity and, respectively, the core and the conductor is filled with small cylinders or adaptors, made of layers of material. It is known that the greater number of layers or elements of a joint, the greater the risk of air trapping. Moreover, the work of installation requires substantial time, and the cost of the joint is increased.

SUMMARY OF THE INVENTION

The present invention provides an improved splice comprising an elastic pliable sleeve for medium or high voltage cables which eliminates the hereinbefore mentioned disadvantages and which ensures an economical joining of cable ends. The resulting splice permits operation at the rated current carrying capacity and employs a minimum number of elements which can be easily installed. The splce is provided with a corona shield to prevent ionization phenomena in the most critical zone of the splice.

The structure includes a tubular metal electrical connector which grips the bare wire ends of high voltage cables. An inner, annular semi-conductive section having a length greater than the length of the bar wire ends encompasses the wire ends and acts as a corona shield. A plurality of circumferentially spaced ribs extend radially inwardly from the inner annular semi-conductive section. The ribs have a longitudinal extent which is equal to a major portion of the length of the electrical connector, and makes contact with the connector over substantially its entire length. The ribs are held under compression between the electrical connector and the inner semi-conductive section. An elongated intermediate insulative section overlies and encompasses the inner annular section and an outer elongated semi-conductive section overlies and encompasses the elongated intermediate insulative section.

An end cap electrically and mechanially connects the ends of the outer semi-conductive section to the outer surface of the high voltage cables. Each end cap is of a semi-conductive material and has a radial dimension such that it engages and variably overlaps the elongated outer section, thereby providing the high voltage splice with a variable overall length.

BRIEF DESCRIPTION OF THE DRAWINGS

The objects and advantages of the invention will become apparent and the invention will be more fully understood when the following description of the invention is read in conjunction with the drawings, wherein:

The high voltage connector 10 is employed to join the ends of a high voltage cable 12. It should be noted that, for convenience, FIG. 1 illustrates essentially one half of a high voltage splice. The connector includes an outer semi-conductive jacket 14, an insulative layer 16, an inner corona shield 18 and a plurality of ribs 20. The ribs can be formed separately from the inner corona shield 18, but most conveniently are made of the same semi-conductive material as the inner corona shield and are formed simultaneously with the shield.

Figure 4:
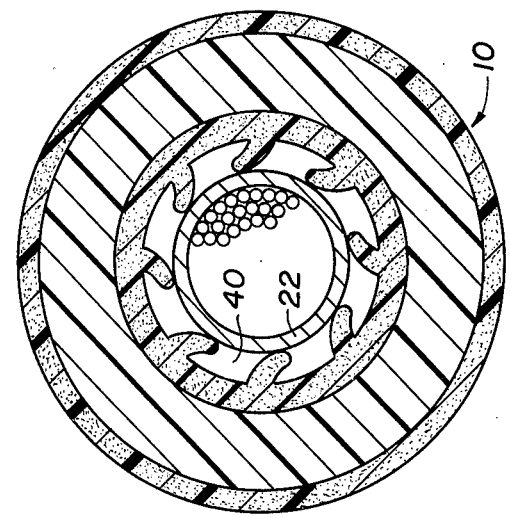
FIG. 4 is a cross-sectional view taken along lines 4—4 of FIG. 1, and showing the connector in its final position over the conductor, and corresponding to FIG. 1.

The ribs serve a plurality of functions including providing electrial contact between the inner corona shield 18 and the metal connector sleeve 22 and providing for heat dissipation. The connector sleeve, as well known in the art, is placed over the bar metal wire ends 24 of cable 12 and is crimped or soldered in order to form a firm electrical mechanical connection. Greater details with respect to the connector can be found in patents such as U.S. Pat. Nos. 3,702,372, 3,673,313 and 3,673,311, the subject matter of which is incorporated herein, by reference.

The air space 40 between the corona shield and the connector 20 is not subject to ionization because there is essentially a zero voltage gradient across the air space.

The ability of the ribs 20 to conduct heat away from the connector 22 is directly related to the amount of surface contact between the ribs 20 and the connector 22. That is, the larger the available heat flow path from the connector 22 to the corona shield 18, the greater is the heat transfer between the two parts. Thus, it is desirable to employ as many ribs as possible. The limiting factor becomes evident when we view the procedure for splicing two ends of a cable.

The splicing procedure involves stripping the outer jacket 21, which is typically of a semi-conductive material, and exposing an insulative layer 26 from each of the two cable ends to be joined. Additionally, a portion of the insulative layer is stripped away to lay bare a portion of the wire 24.

The high voltage connector 10 is slipped over an end of one of the cables and forced a sufficient distance to expose the bare end of the wire 24. It is apparent that the connector must be made of a material which is sufficiently pliable to permit the expansion over the unstripped portion of the cable 12, but resilient enough to return to its original size and tightly grip the insulative layer 26. The ribs 20 must undergo an extreme dimension change since they must be capable of expanding over at least the portion of the cable 12 stripped to expose the insulative layer 26 and of returning to their initial size to tightly grip the metal connector 22 after the bare ends of the wire 24 have been inserted approximately equi-distant into the connector 22, the connector crimped or otherwise caused to securely grip the bare wires and the connector 10 has been moved to is functional position, in which it encloses the ends of the cables being spliced.

Figure 3:
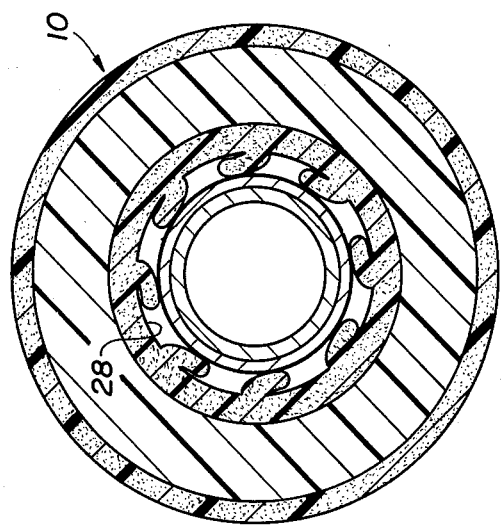
FIG. 3 is a transverse cross-sectional showing the connector in position over the conductor during the assembly operation.
Figure 2:
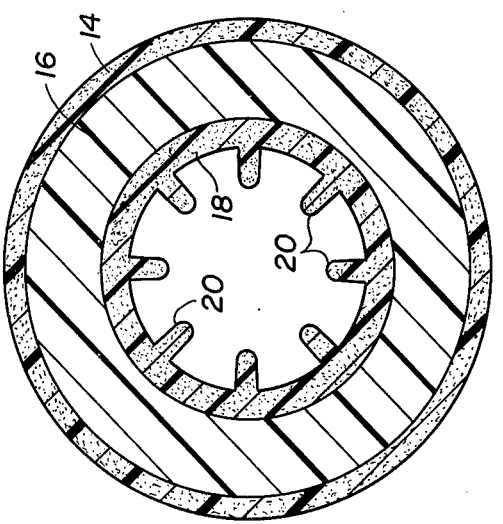
FIG. 2 is a transverse cross-sectional view showing the connector alone.

As illustrated in FIG. 3, the ribs capable of virtually flattening against the inner surface 28 of the corona shield 18.

In this configuration, the maximum number and dimensions of the ribs, in combination, is such that all of the available interior space between the outer surface of the insulative layer 26, the inner surface 28 of the corona shield 18, and the space between adjacent ribs, is totally filled by the ribs in their folded over configuration. While the number of ribs which can be used is, at least, in part, dependent upon the dimensions of the parts as well as the thermal and electrial conductivity of the ribs, it has been found that preferably, at least six ribs should be used, and that as many as 18 ribs can be used. As few as three ris can be used but the contact and conductivity provided will be, at best, marginal.

As illustrated in FIG. 4, the ribs 20 return to approximately their original configuration, depending upon the diameter of the connector 22. Obviously, a better contact is made between the ribs and the connector 22 when the ribs are in at least a slightly compressed configuration. The ribs must be pliable, in order to flex around the cable 12, resilient, in order to return to their unflexed configuration, and rigid, in order to exert a substantial pressure against the connector 22.

Advantageously, an elastomer having a Durometer, Shore A, hardness of approximately 60 can be used. The hardness range can, however, extend from 45 to 75.

Figure 1:
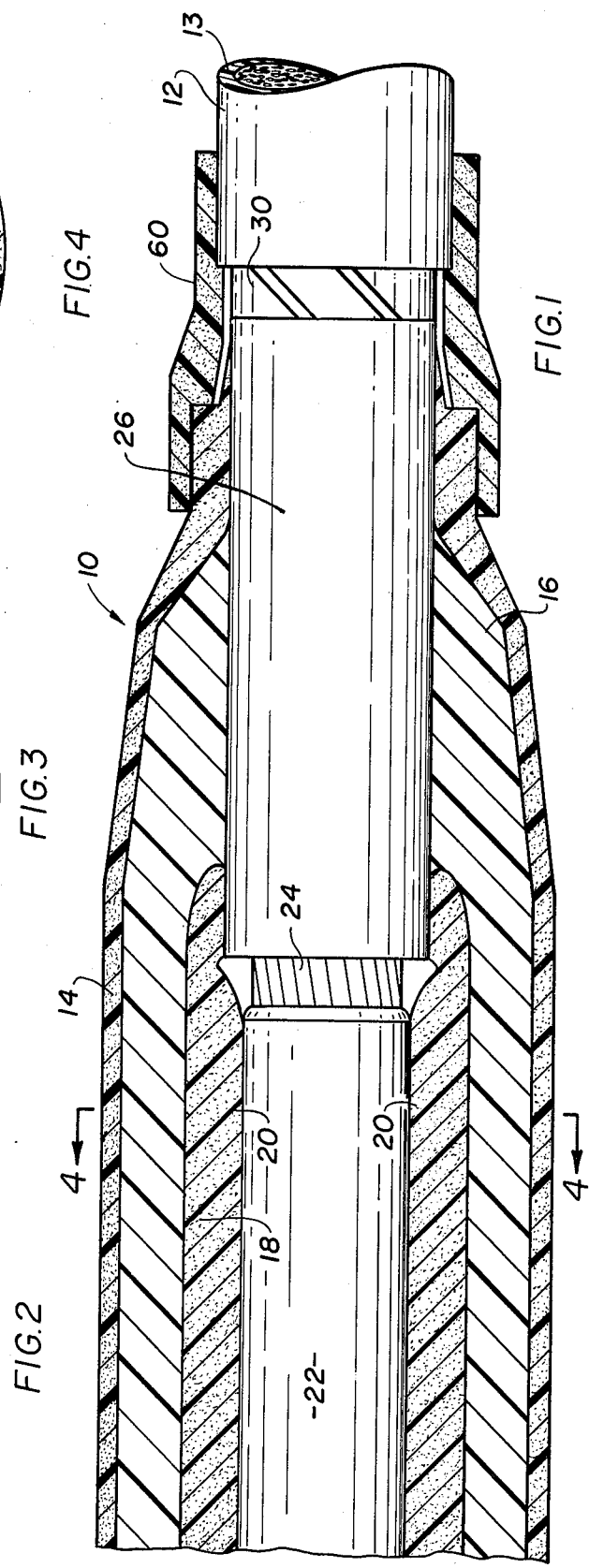
FIG. 1 is a fragmentary view, partly in longitudinal cross-section, of a high voltage connector in accordance with the present invention.
Figure 5:
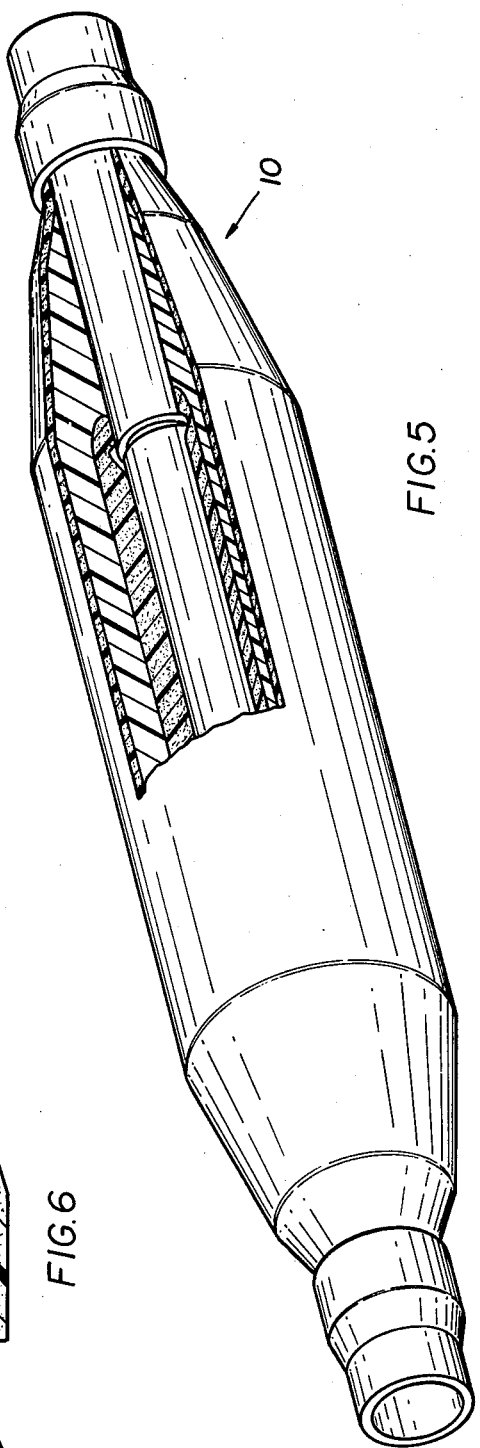
FIG. 5 is a perspective view of the connector of FIG. 1, shown with a portion cut away.
Figure 6:
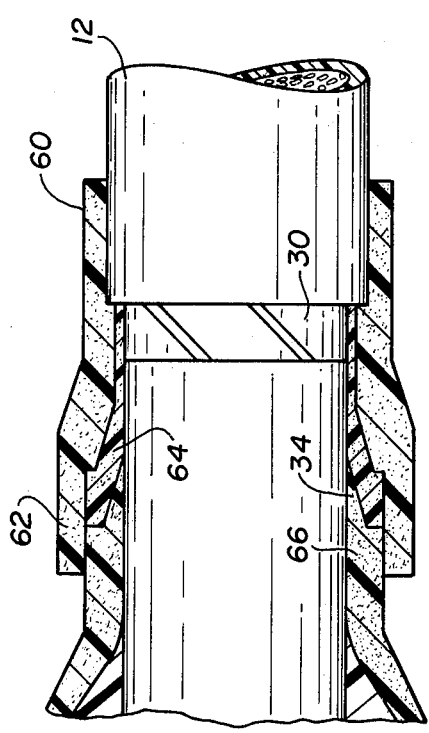
FIG. 6 is a fragmentary cross-sectional view of the end cap region of the connector.

The ribs should also be noted, as best seen in FIGS. 1 and 5, to have a longitudinal configuration such that a uniform contact is made between each of the ribs and the connector 22, along substantially the entire length of the connector.

Along these lines, attention is invited to U.S. Pat. No. 3,673,311, which illustrates the use of ribs which make, what can be characterized as, single point contact with the connector and thus readily permit the insertion of a large diameter cable, but would provide a negligible level of thermal transfer, and at best, a marginally adequate electrical contact. It should be evident at this point that the rib contact surface must be maximized. In high voltage systems, a surface to surface contact of the type employed in U.S. Pat. No. 3,673,311 and discussed in column 2, lines 35 to 49 can be employed.

The system of the invention can be employed with various types of cables as for example the concentric neutral type having an extruded shield, lead jacketed type with tape shield, polymeric tape shielded, etc. Reference to a particular type of cable is for illustration purposes only and not intended to be by way of limitation.

The semi-conductive outer jacket 14 is joined to the semi-conductive layer 30 of the cable 12 by means of a semi-conductive tape or mastic 64 which is applied at each end, 34, of the connector 10 which produces a void-free interface. The conductive metal of jacket 13 can be of lead and the semi-conductive layer 30 can be in the form of a tape or extruded material. An end cap 60, of semi-conductive material is then slid from its position on cable 12 to a position in engagement with the mastic or tape 64 and the splice end 34. The cap 60 has an annular region 62 which has an inner diameter approximately equal to, or slightly smaller than the outer diameter of the annular end region 66 of the connector 10, so as to firmly grip the end 66 of the connector 10.

The annular region 62 of the cap overlaps the corresponding annular region 66 of the connector 10 to a sufficient degree to permit a substantial adjustment factor. It has been found that when making splices, it is impossible, from a practical standpoint, to trim the cable ends and cut the bare wire with a high degree of accuracy. The use of a semi-conductive tape alone as an end joint overcomes the problem of dimensional inaccuracies but results in a low reliability joint. The end cap compresses and thus protects and holds the semi-conductive tape in place, overcoming the previously mentioned shortcomings.

The overlapped end units which firmly engage each other over a space which an vary as much as ¼ inch provide the necessary dimensional flexibility to enable rapid, reliable joints to be made under actual field conditions.

What is claimed is:

1. A high voltage cable splice comprising:
   a pair of high voltage cabled having lengths of exposed bare wire ends and outer shells;
   an electrical connector electrically joining said bare wire ends; and
   an elongated member positioned on said cables in overlying relation to said bare wire ends and said electrical connector and having,
   an inner annular semi-conductive section, said inner annular semi-conductive section having a longitudinal extent greater than the length of the bare wire ends, thereby encompassing said bare wire ends and providing a corona shield section, said inner annular semi-conductive section having plurality of circumferentially spaced ribs, extending radially inwardly and having a longitudinal extend which is equal to a major portion of the length of said electrical connector, each rib making contact with said connector over substantially its entire length, the uncompressed radial inward length of each rib being greater than the radial distance between said inner annular section and said electrical connector, said ribs thereby being maintained under a compressive force over substantially their entire length; whereby said ribs present extensive contact surface to said connector;
   an elongated intermediate insulative section overlying and encompassing said inner annular semi-conductive section; and
   an outer elongated semi-conductor section overlying and encompassing said elongated intermediate insulative section.

2. The splice of claim 1, wherein said ribs are spaced from each other by a distance which is substantially equal to the radial length of said ribs.

3. The splice of claim 1, wherein said ribs are made of an elastomeric material and have a hardness on the order of a 60 Shore A durometer hardness.

4. The splice of claim 1, wherein said elongated member is pliant and radially extensible and compressively grips said outer shells.

5. The splice of claim 1, wherein said spaced ribs are at least six in number.

* * * * *